US009562988B2

(12) United States Patent
Wilson et al.

(10) Patent No.: US 9,562,988 B2
(45) Date of Patent: Feb. 7, 2017

(54) METHODS AND SYSTEMS OF ELECTROMAGNETIC INTERFEROMETRY FOR DOWNHOLE ENVIRONMENTS

(71) Applicant: Halliburton Energy Services, Inc., Houston, TX (US)

(72) Inventors: Glenn A. Wilson, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/909,914

(22) PCT Filed: Dec. 13, 2013

(86) PCT No.: PCT/US2013/075117
§ 371 (c)(1),
(2) Date: Feb. 3, 2016

(87) PCT Pub. No.: WO2015/088563
PCT Pub. Date: Jun. 18, 2015

(65) Prior Publication Data
US 2016/0187525 A1 Jun. 30, 2016

(51) Int. Cl.
*G01V 3/00* (2006.01)
*G01V 3/30* (2006.01)
(Continued)

(52) U.S. Cl.
CPC .............. *G01V 3/30* (2013.01); *E21B 47/122* (2013.01); *E21B 49/00* (2013.01); *E21B 49/08* (2013.01); *G01V 99/005* (2013.01); *G01V 3/28* (2013.01)

(58) Field of Classification Search
CPC .................................... G01V 3/30; G01V 3/38
(Continued)

(56) References Cited

U.S. PATENT DOCUMENTS 5,563,513 A 10/1996 Tasci et al.
5,770,945 A 6/1998 Constable
(Continued)

FOREIGN PATENT DOCUMENTS

EP 1803001 2/2012
WO WO-2005/085909 9/2005
(Continued)

OTHER PUBLICATIONS

"International Preliminary Report on Patentability from IPEA", dated Nov. 30, 2015 "Methods and Systems of Electromagnetic Interferometry for Downhole Environments", Appl. No. PCT/US2013/075117 filed Dec. 13, 2013, 19 pgs.
(Continued)

*Primary Examiner* — Reena Aurora
(74) *Attorney, Agent, or Firm* — Iselin Law PLLC; Benjamin Fite

(57) ABSTRACT

A disclosed electromagnetic (EM) interferometry system includes a first EM field sensor at a first position in a downhole environment. The system also includes a second EM field sensor at a second position in the downhole environment. The system also includes a processing unit that receives a first EM field measurement from the first EM field sensor and a second EM field measurement from the second EM field sensor. The processing unit derives a response of the first EM field sensor to a virtual EM field source at the second position by cross-correlating the first EM field measurement with the second EM field measurement. The processing unit also performs an inversion process based at least in part on the derived response to obtain a model of subsurface formation properties.

20 Claims, 5 Drawing Sheets

(51) Int. Cl.
E21B 47/12 (2012.01)
E21B 49/00 (2006.01)
E21B 49/08 (2006.01)
G01V 99/00 (2009.01)
G01V 3/28 (2006.01)

(58) Field of Classification Search
USPC .......................................................... 324/338
See application file for complete search history.

(56) References Cited

U.S. PATENT DOCUMENTS

| | | |
|---|---|---|
| 6,332,109 B1 | 12/2001 | Sheard et al. |
| 6,914,433 B2 | 7/2005 | Wright et al. |
| 7,109,717 B2 | 9/2006 | Constable |
| 8,437,961 B2 | 5/2013 | Srnka et al. |
| 8,633,700 B1 | 1/2014 | England et al. |
| 8,710,845 B2 | 4/2014 | Lindqvist et al. |
| 9,008,970 B2 | 4/2015 | Donderici et al. |
| 9,081,114 B2 | 7/2015 | Nie et al. |
| 9,091,785 B2 | 7/2015 | Donderici et al. |
| 9,181,754 B2 | 11/2015 | Donderici et al. |
| 2003/0038634 A1 | 2/2003 | Strack |
| 2008/0106265 A1 | 5/2008 | Campbell |
| 2008/0123467 A1 | 5/2008 | Ronnekleiv et al. |
| 2008/0246485 A1 | 10/2008 | Hibbs et al. |
| 2008/0290873 A1 | 11/2008 | Homan et al. |
| 2009/0005994 A1 | 1/2009 | Srnka et al. |
| 2010/0277177 A1 | 11/2010 | Alumbaugh et al. |
| 2011/0084696 A1 | 4/2011 | Tenghamn et al. |
| 2011/0158043 A1 | 6/2011 | Johnstad |
| 2012/0130641 A1 | 5/2012 | Morrison et al. |
| 2012/0212229 A1 | 8/2012 | Sinclair et al. |
| 2013/0105224 A1 | 5/2013 | Donderici et al. |
| 2013/0146756 A1 | 6/2013 | Schmidt |
| 2013/0207661 A1 | 8/2013 | Ellingsrud et al. |
| 2014/0032116 A1 | 1/2014 | Guner et al. |
| 2014/0097848 A1 | 4/2014 | Leblanc et al. |
| 2014/0191761 A1 | 7/2014 | San Martin et al. |
| 2015/0137817 A1 | 5/2015 | Wilson et al. |
| 2015/0160365 A1 | 6/2015 | Donderici et al. |
| 2015/0330190 A1 | 11/2015 | Wu et al. |

FOREIGN PATENT DOCUMENTS

| | | |
|---|---|---|
| WO | WO-2012/100217 | 7/2012 |
| WO | WO-2012/145583 | 10/2012 |
| WO | WO-2012/177349 | 12/2012 |

OTHER PUBLICATIONS

"International Search Report and Written Opinion", dated Aug. 11, 2015 Appl No. PCT/US2014/067774, "Offshore Electromagnetic Reservoir Monitoring," filed Nov. 26, 2014, 17 pgs.
"PCT Application as Filed", Appl No. PCT/US2014/067774, "Offshore Electromagnetic Reservoir Monitoring," filed Nov. 26, 2014, 27 pgs.
"PCT International Search Report & Written Opinion", dated Sep. 12, 2014, Appl No. PCT/US2013/075117, "Methods and Systems of Electromagnetic Interferometry for Downhole Environments," filed Dec. 13, 2013, 14 pgs.
Andréis, David et al., "Using CSEM to Monitor Production From a Complex 3D Gas Reservoir—a Synthetic Case Study", The Leading Edge, 30 (11), 2011, pp. 1070-1079.
Berre, Inga et al., "Identification of three-dimensional electric conductivity changes from time-lapse electromagnetic observations", Journal of Computational Physics, 230, 2011, pp. 3915-3928.
Black, Noel et al., "3D inversion of time-lapse CSEM data based on dynamic reservoir simulations of the Harding field, North Sea", 2011 SEG San Antonio 2011 Annual Meeting, pp. 2417-2421.
Black, Noel et al., "3D inversion of time-lapse CSEM data for reservoir surveillance", SEG Denver 2010 Annual Meeting 716, 5 pgs.
Black, Noel et al., "Monitoring of hydrocarbon reservoirs using marine CSEM method", SEG Houston 2009 International Exposition and Annual Meeting, 2009, 5 pgs.
Chuprin, Andrei et al., "Quantifying factors affecting repeatability in CSEM surveying for reservoir appraisal and monitoring", SEG Las Vegas 2008 Annual Meeting, pp. 648-652.
Colombo, Daniele et al., "Quantifying Surface-to-Reservoir Electromagnetics for Waterflood Monitoring in a Saudi Arabian Carbonate Reservoir", Geophysics, 78(6), 2013, pp. E281-E297.
Hibbs, A. D. et al., "Capacitive Electric Field Measurements for Geophysics", EAGE Conference and Exhibition incorporating SPE EUROPEC 2011, Vienna, Austria, Expanded Abstracts, 2 pgs.
Hibbs, Andrew et al., "New Electromagnetic Sensors for Magnetotelluric and Induced Polarization Geophysical Surveys", SEG Annual Meeting, Expanded Abstracts, 2012, 5 pgs.
Holten, T et al., "Time lapse CSEM measurements for reservoir monitoring using a vertical receiver-transmitter setup", 2011 SEG San Antonio 2011 Annual Meeting, pp. 697-701.
Hordt, A et al., "A First Attempt at Monitoring Underground Gas Storage by Means of Time-lapse Multichannel Transient Electromagnetics", Geophysical Prospecting, 2000, 48, 489-509, European Association of Geoscientists & Engineers, 21 pgs.
Kang, Seogi et al., "A Feasibility Study of CO2 Sequestration Monitoring Using the MCSEM Method at a Deep Brine Aquifer in a Shallow Sea", Geophysics 77 (2), 2012, pp. E117-E126.
Liang, Lin et al., "Joint Inversion of Controlled-Source Electromagnetic and Production Data for Reservoir Monitoring", Geophysics 77 (5), 2012, pp. ID9-ID22.
Lien, Martha et al., "Sensitivity Study of Marine CSEM Data for Reservoir Production Monitoring", Geophysics, 73 (4),2008, pp. F151-F163.
Marsala, Alberto F. et al., "First Borehole to Surface Electromagnetic Survey in KSA: Reservoir Mapping and Monitoring at a New Scale", SPE 146348, 2011, 9 pgs.
Marsala, Alberto F. et al., "Six-Component Tensor of the Surface Electromagnetic Field Produced by a Borehole Source Recorded by Innovative Capacitive Sensors", Presented at SEG 83rd Annual Meeting, 2013, 5 pgs.
Orange, Arnold et al., "The Feasibility of Reservoir Monitoring Using Time-Lapse Marine CSEM", Geophysics, 74 (2), 2009, pp. F21-F29.
Park, Joonsang et al., "CSEM sensitivity study for Sleipner CO2-injection monitoring", Energy Procedia 37, SciVerse ScienceDirect, 2013, pp. 4199-4206.
Salako, O et al., "Potential Applications of Time-lapse Marine CSEM to Reservoir Monitoring", 75th EAGE Conference & Exhibition incorporating SPE EUROPEC, London, UK, Jun. 10-13, 2013, 2013, 5 pgs.
Schamper, Cyril et al., "4D CSEM Feasibility Study: A Land Example", SEG Houston 2009 International Exposition and Annual Meeting, 5 pgs.
Strack, K M., et al., "Integrating Long-Offset Transient Electromagnetics (LOTEM) with Seismics in an Exploration Environment", Geophysical Prospecting, 1996, 44, European Association of Geo-scientists & Engineers, 21 pgs.
Tseng, H.W. et al., "A Borehole-to-Surface Electromagnetic Survey", Geophysics, 63(5), 1998, pp. 1565-1572.
Wirianto, Marwan et al., "A Feasibility Study of Land CSEM Reservoir Monitoring in a Complex 3D Model", Geophysical Journal International, Piers Online, vol. 6, No. 5, 2010, pp. 440-444.
Wright, David et al., "Hydrocarbon detection and monitoring with a multicomponent transient electromagnetic (MTEM) survey", The Leading Edge, 21 (9), 2002, pp. 862-864.
Zach, J.J. et al., "Marine CSEM Time-Lapse Repeatability for Hydrocarbon Field Monitoring", Presented at SEG Annual Meeting in Houston, 2009, 5 pgs.
Zhdanov, Michael S. et al., "Feasibility study of electromagnetic monitoring of CO2 sequestration in deep reservoirs", SEG Houston 2013 Annual Meeting, DOI http://dx.doi.org/10.1190/segann2013-0694.1, pp. 2417-2421.

(56) References Cited

OTHER PUBLICATIONS

Zhdanov, Michael S., et al., "3D inversion of towed streamer EM data—A model study of the Harding field and comparison to 3D CSEM inversion", SEG San Antonio 2011 Annual Meeting, 5 pgs.

Ziolkowski, Anton et al., "Multi-Transient Electromagnetic Repeataibility Experiment Over the North Sea Harding Field", Geophysical Prospecting, 58, 2010, pp. 1159-1176.

METHODS AND SYSTEMS OF ELECTROMAGNETIC INTERFEROMETRY FOR DOWNHOLE ENVIRONMENTS

BACKGROUND

During oil and gas exploration, many types of information are collected and analyzed. The information is used to determine the quantity and quality of hydrocarbons in a reservoir, and to develop or modify strategies for hydrocarbon production. One technique for collecting relevant information involves logging or monitoring the electromagnetic (EM) fields in a formation. Such systems must overcome a number of obstacles, including high temperatures, vibrations, space limitations, etc., and development efforts to address these concerns are ongoing. One vexing issue for many such systems is the requirement for a downhole EM source, which necessitates a sizeable downhole energy source with a limited lifetime or with some cumbersome method for supplying power from the surface. The suggested use of an ambient EM signal energy, such as the Earth's magnetotelluric currents, faces certain feasibility issues arising from low signal strength and poor source localization.

BRIEF DESCRIPTION OF THE DRAWINGS

Accordingly, there are disclosed herein various electromagnetic (EM) interferometry methods and systems that at least partly address these issues. In the drawings.

Figure 1:
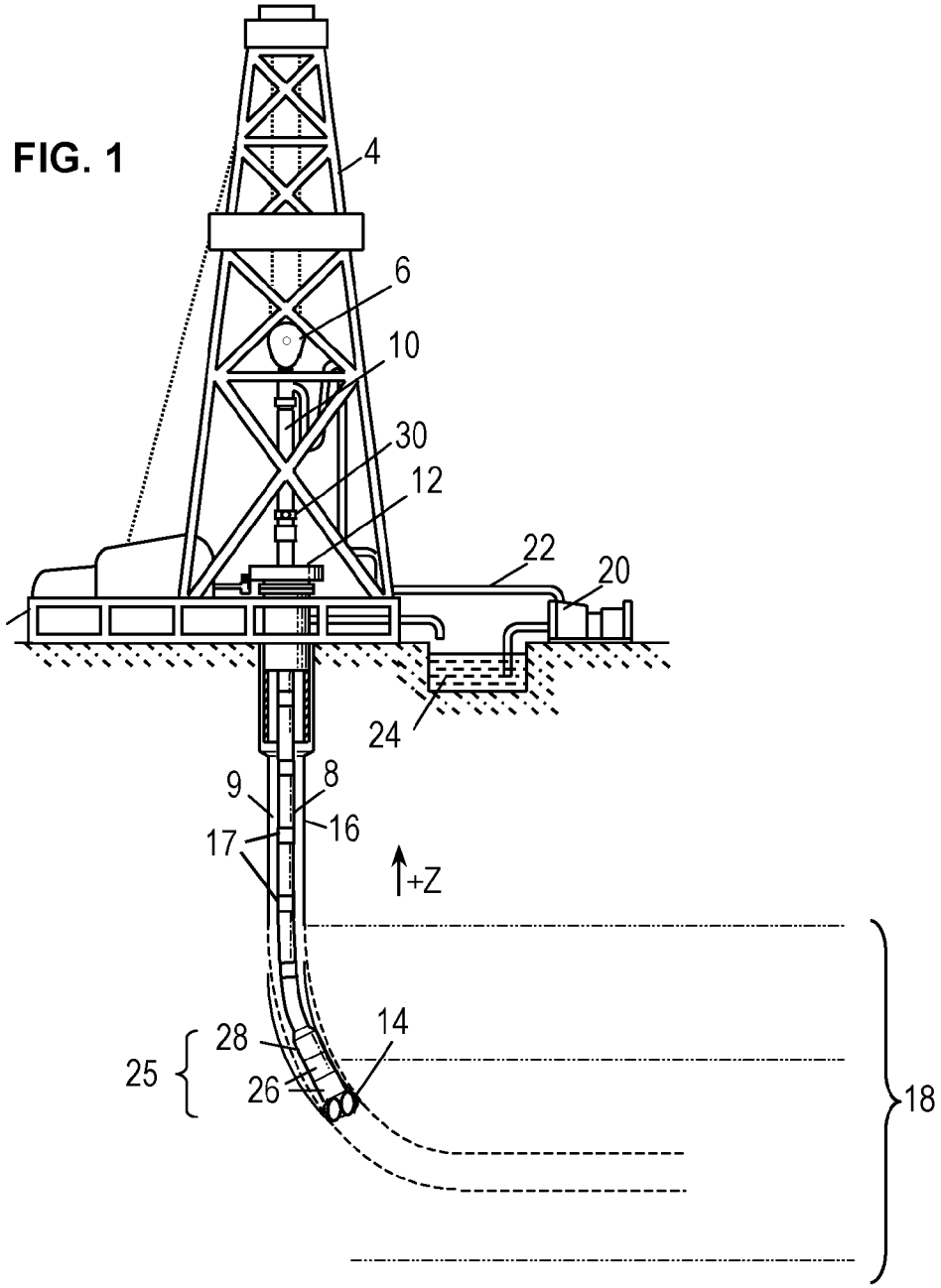
FIG. 1 shows an illustrative drilling environment.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

The following disclosure presents an electromagnetic (EM) interferometry technology suitable for use in downhole environments. The disclosed techniques employ a plurality of downhole EM field sensors to measure ambient EM fields. The ambient EM field measurements are cross-correlated to derive responses of an EM field sensor array to a virtual EM field source positioned at one of the EM field sensors. The responses to one or more virtual EM field sources can be inverted to determine properties and/or to provide an image of the downhole environment.

The disclosed EM interferometry system and method embodiments can be best appreciated in suitable application contexts such as drilling environments, wireline environments, and monitoring well environments. FIG. 1 shows an illustrative drilling environment having a drilling platform 2 that supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole 16.

In FIG. 1, EM field sensors 17 are distributed along the drill string 8. For example, such sensors 17 may be attached to or integrated with adapters that join sections of the drill string 8 together. Additionally or alternatively, EM field sensors could be attached to or integrated with other components such as a logging tool 28 or other components of bottom-hole assembly 25, which includes drill collars 26 and drill bit 14. The drill collars 26 are thick-walled steel pipe sections that provide weight and rigidity for the drilling process. The logging tool 28 (which may be built into the drill collars) gathers measurements of various drilling or formation parameters. The collected measurements may be plotted and used for steering the drill string 8 and/or to analyze formation properties.

In some embodiments, measurements from the sensors 17 are transferred to the surface using known telemetry technologies or communication links. Such telemetry technologies and communication links may be integrated with logging tool 28 and/or other sections of drill string 8. As an example, mud pulse telemetry is one common technique for providing a communications link for transferring logging measurements to a surface receiver 30 and for receiving commands from the surface, but other telemetry techniques can also be used.

Figure 2:
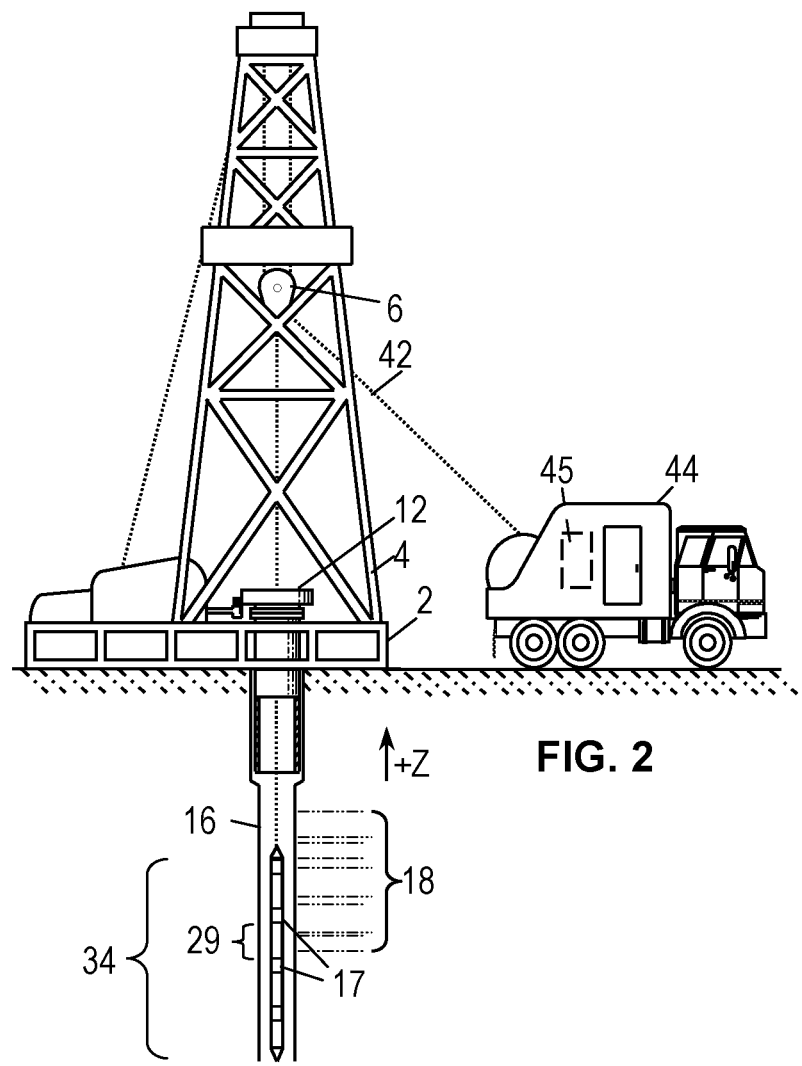
FIG. 2 shows an illustrative wireline environment.

At various times during the drilling process, the drill string 8 shown in FIG. 1 may be removed from the borehole 16. Once the drill string 8 has been removed, as shown in FIG. 2, a wireline tool string 34 can be lowered into the borehole 16 by a cable 42. In some embodiments, the cable 42 includes conductors for transporting power to the tools and telemetry from the tools to the surface. It should be noted that various types of formation property sensors can be included with the wireline tool string 34. As shown, the illustrative wireline tool string 34 includes logging sonde 29 with EM field sensors 17.

In FIG. 2, a wireline logging facility 44 collects measurements from the EM field sensors 17 and/or or other instruments in the logging sonde 29. In some embodiments, the wireline logging facility 44 includes computing facilities 45 for managing logging operations, for acquiring and storing measurements gathered by the logging sonde 29 and/or EM field sensors 17, for inverting measurements determine formation properties, and for displaying the measurements or formation properties to an operator. The tool string 34 may be lowered into an open section of the borehole 16 or a cased section of the borehole 16. In a cased borehole environment, the casing may produce attenuation to signals that are received by the EM field sensors 17. However, the disclosed techniques can still be performed in a cased borehole environment, especially at low frequencies where attenuation due to casing is low.

Figure 3:
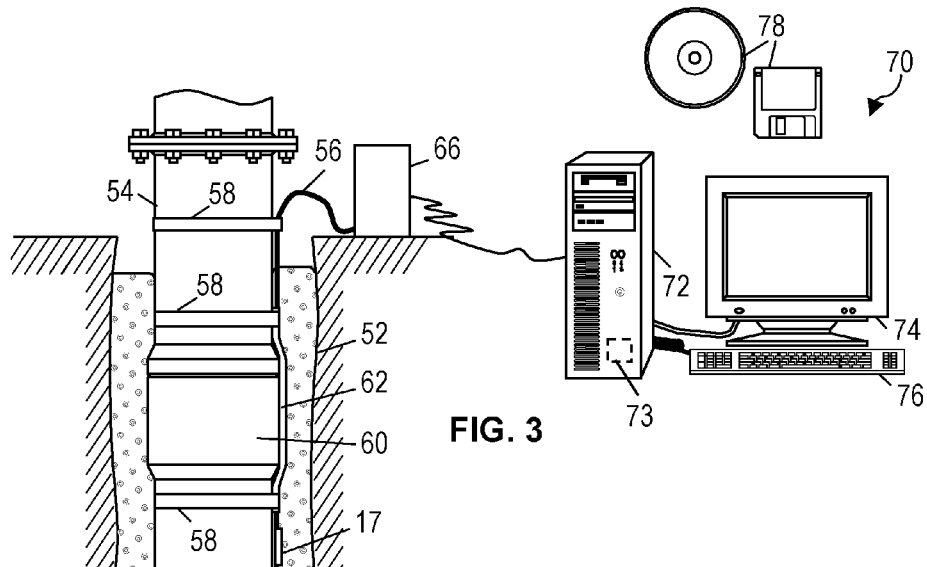
FIG. 3 shows an illustrative monitoring well environment.

FIG. 3 shows an illustrative well monitoring environment with a borehole 52 containing a casing string 54 with a cable 56 secured to it by bands 58. The cable 56 enables data and/or power transmissions. Where the cable 56 passes over a casing joint 60, it may be protected from damage by a cable protector 62. The remaining annular space in the borehole 52 may be filled with cement 68 to secure the casing 54 in place and prevent fluid flows in the annular space. Once cementing is complete, fluid can still enter uncemented portions of the well and reaches the surface through the interior of the casing 15. In alternative embodiments, fluid may enter through perforated portions of the well casing 54 (not shown).

In FIG. 3, EM field sensors 17 couple to the cable 56 to enable EM field measurements to be obtained or conveyed to a surface interface 66 via the cable 56. The surface interface 66 may be coupled to a computer 70 that acts as a data acquisition system and/or a data processing system that analyzes the measurements to derive subsurface parameters and track them over time. In some contemplated system embodiments, the computer 70 may further control production parameters to optimize production based on the information derived from the measurements.

The computer 70 includes a chassis 72 that houses various electrical components such as processor 73, memories, drives, graphics cards, etc., The computer 70 also includes a monitor 74 that enables a user to interact with the software via a keyboard 76. Other examples of input devices include a mouse, pointer devices, and touchscreens. Further, other examples of output devices include a printer. Software executed by the computer 70 can reside in computer memory and on non-transient information storage media 78. The computer may be implemented in different forms including, for example, an embedded computer installed as part of the surface interface 76, a portable computer that is plugged into the surface interface 76 as desired to collect data, a remote desktop computer coupled to the surface interface 76 via a wireless link and/or a wired computer network, a mobile phone/PDA, or indeed any electronic device having a programmable processor and an interface for I/O.

In accordance with at least some embodiments, the processor 73 receives ambient EM field measurements from a plurality of the EM field sensors 17. The processor 73 cross-correlates the received ambient EM field measurements to derive responses of the EM field sensors 17 to a virtual EM field source at the positions of any one of the EM field sensors 17. The derived responses can be inverted to determine properties and/or to provide an image of the downhole environment. Similar processing of ambient EM fields can be performed for the drilling environment of FIG. 1 and/or the wireline environment of FIG. 2.

Regardless of where the EM field sensors 17 are located in FIGS. 1-3, these EM field sensors 17 may couple to an electrical or optical cable that runs along the drill string 8, the wireline 42, or the casing 54. Some contemplated system embodiments employ wired drill pipe or wired casing having couplers that provide continuity of the integrated electrical or optical paths. In such embodiments, some or all of the couplers may further include integrated EM field sensors 17. Other contemplated embodiments have the sensors 17 coupled to an electrical or optical cable strapped to the casing 54 or the drill string 8, or spaced along the wireline cable 42. In at least some alternative embodiments, the EM field sensors 17 use wireless communications to convey EM field measurements to the surface or to a downhole interface that conveys the measurement received from the EM field sensors 17 to the surface. The EM field sensors may in some cases implement a mesh network to transfer data in a bucket-brigade fashion to the surface.

Figures 4A, 4B:
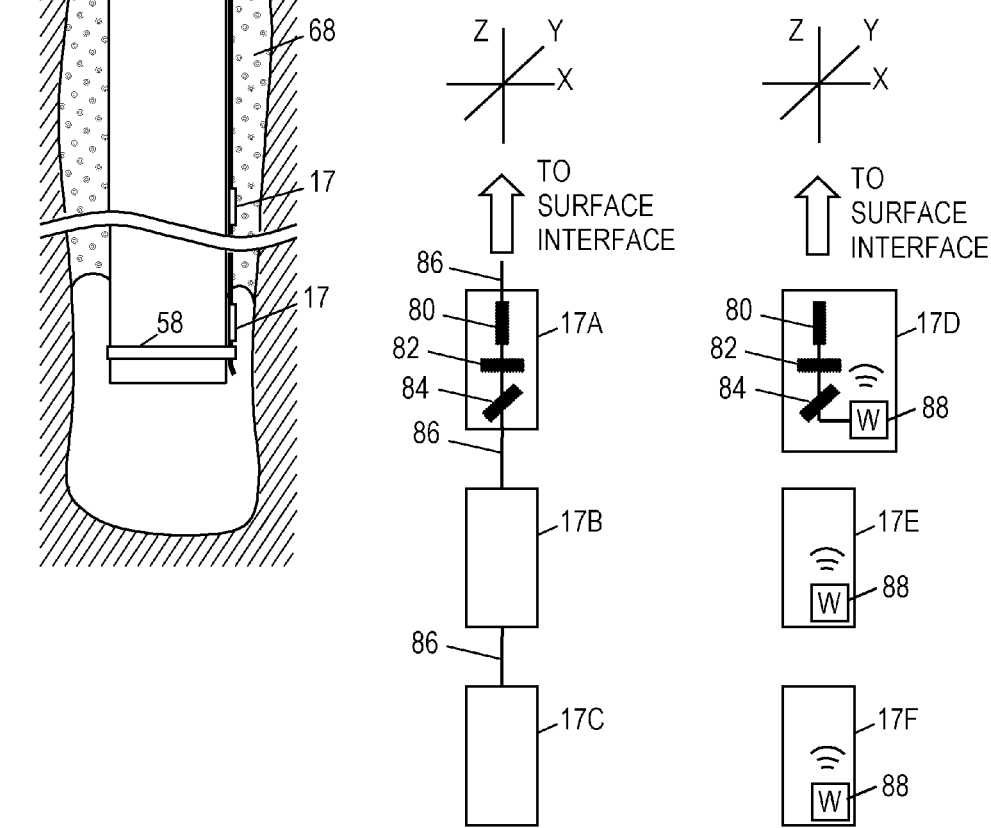
FIGS. 4A and 4B show illustrative EM field sensor configurations.

FIGS. 4A and 4B show illustrative EM field sensor configurations that could be implemented in the drilling environment of FIG. 1, the wireline environment of FIG. 2, or the well monitoring environment of FIG. 3. In FIG. 4A, sensor groups 17A-17C couple to a cable 86 to perform ambient EM field measurements and/or to convey ambient EM field measurements to a surface interface (e.g., interface 66). The cable 86 may correspond to the cable 56 of FIG. 3 or to a cable that runs along or within the drill string 8 or wireline tool string 34. Each of the sensor groups 17A-17C includes orthogonal EM field sensors 80, 82, 84 (not shown for groups 17B and 17C), where sensor 80 is oriented along the z-axis, sensor 82 is oriented along the x-axis, and sensor 84 is oriented along the y-axis. In some embodiments, the cable 86 corresponds to one or more electrical conductors to carry data and/or power. In such case, the EM field sensors 80, 82, 84 may correspond to coils or another type of transducer that generates or modifies an electrical signal in response to an ambient EM field. EM field sensors 80, 82, 84 may also be non-orthogonal. As long as they form a linearly independent set of measurements, and their directionality is known, a coordinate transformation operation can be performed to convert the data obtained from non-orthogonal sensors to orthogonal data. The generated or modified electrical signal is transmitted to a surface interface (e.g., interface 66) via cable 86, where its characteristics can be interpreted to decode information about the EM field sensed by one or more of the sensors 80, 82, 84 in sensor groups 17A-17C.

In another embodiment, the cable 86 corresponds to one or more optical fibers to carry data and/or power. In such case, the EM field sensors 80, 82, 84 generate or modify a light signal in response to sensing an ambient EM field. The generated or modified light signal is transmitted to a surface interface (e.g., interface 66) via one or more optical fibers. The surface interface converts the light signal to an electrical signal, whose characteristics encode information about the EM field sensed by sensor groups 17A-17C. It should also be understood that electro-optical converters may also be employed to change electrical signals to optical signals or vice versa. Thus, EM sensor technology that generates or modifies a light signal could be part of a system where cable 86 has electrical conductors. In such case, the generated or modified light signal is converted to an electrical signal for transmission via cable 86. Similarly, EM sensor technology that generates or modifies an electrical signal could be part of a system where cable 86 has optical fibers. In such case, the generated or modified electrical signal is converted to a light signal for transmission via cable 86.

In FIG. 4B, each of the sensor groups 17D-17F includes orthogonal EM field sensors 80, 82, 84 (not shown for groups 17E and 17F), oriented as described for FIG. 4A. EM field sensors 80, 82, 84 may also be non-orthogonal as described for the configuration in FIG. 4A. Further, each of the sensor groups 17D-17F includes a wireless interface 88 to enable communications with a surface interface (e.g., interface 66). Each wireless interface 88 may include a battery, at least one wireless module, and a controller. In at least some embodiments, the wireless interfaces 88 are part of a wireless mesh in which short-range wireless communications are used to pass data from one wireless interface 88 to another until the data is received by a surface interface. As an example, a short-range wireless protocol that could be employed by each wireless interface 88 is Bluetooth®. EM field sensor configurations such as those shown in FIGS. 4A and 4B may vary with respect to the position of sensor groups, the types of sensors used, the orientation of sensors, the number of cables used, the wireless protocols used, and/or other features.

Figure 5:
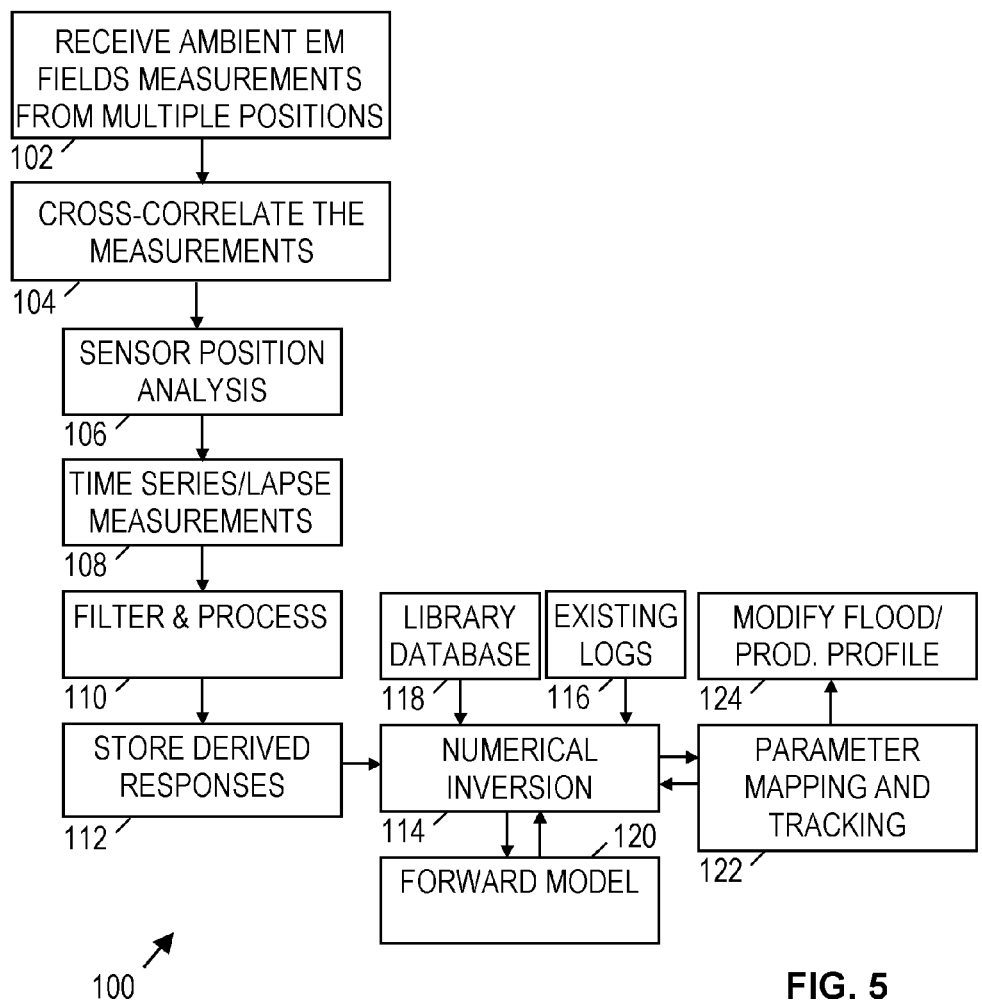
FIG. 5 shows illustrative EM interferometry operations.

FIG. 5 shows illustrative EM interferometry operations 100 in the form of a function-block diagram. The operations 100 may be performed, for example, by software modules or processes executing on one or more processors or computers in communication with a drill string, wireline tool string, or monitoring well equipped with EM field sensors as described herein. In accordance with at least some embodiments, no EM field source is needed for operations 100. At block 102, ambient EM fields are concurrently measured at multiple sensor positions. The measurement operations of block 102 can occur continuously, periodically, or as needed. At block 104, the measurement at a given sensor position is cross-correlated with the measurements from other sensor positions to derive the responses of the other sensors to a virtual EM field source at the given position. This operation can be repeated taking each sensor position in turn as the position of the virtual EM field source, thereby obtaining a full virtual EM survey. Where multi-component measurements are taken, each component at the given sensor position may be cross-correlated in turn with each component measured at the other sensor positions, yielding responses to virtual EM field sources with each orientation at the given position.

At block 106, sensor position analysis is performed to associate sensor positions with the derived responses. Particularly in the drilling and wireline environments, the sensor positions may change and need to be re-determined for each measurement cycle. At block 108, measurements are repeated and virtual EM field source responses are collected as a function of time. At block 110, a data processing system filters and processes the responses to a virtual EM field source to calibrate them and improve signal-to-noise ratio. Suitable operations include bandpass filtering to reduce noise; averaging multiple sensor data to reduce noise; taking the difference or the ratio of multiple voltages to remove unwanted effects such as a common voltage drift due to temperature; applying other temperature correction schemes such as a temperature correction table; calibration to known/expected resistivity values from an existing well log; and array processing (software focusing) of the data to achieve different depth of detection or vertical resolution.

At block 112, the processed responses are stored for use as inputs to an inversion process at block 114. Other inputs to the inversion process of block 114 may include existing logs 116 such as formation resistivity logs, porosity logs, etc. Still other inputs to the inversion process of block 114 may include a library of calculated signals 118 or a forward model 120 of the system that generates predicted signals in response to model parameters (e.g., a two- or three-dimensional distribution of resistivity). As part of generating the predicted signals, the forward model 120 determines a multidimensional model of the subsurface electromagnetic field. All resistivity, electric permittivity (dielectric constant) or magnetic permeability properties of the formation can be measured and modeled as a function of time and frequency. The parameterized model can involve isotropic or anisotropic electrical (resistivity, dielectric, permeability) properties. More complex models can be employed so long as sufficient numbers of sensor types, positions, orientations, and frequencies are employed. The inversion process searches a model parameter space to find the best match between stored responses 112 and generated signals. At block 122, parameters generated by the inversion process of block 114 are stored and used as a starting point for iterations at subsequent times.

In at least some embodiments, effects due to presence of tubing, casing, mud and cement can be corrected by using a-priori information on these parameters, or by solving for some or all of them during the inversion process. Since all of these effects are mainly additive and they typically remain the same over time, a differential time-lapse measurement can remove them. Multiplicative (scaling) portions of the effects can be removed in the process of calibration to an existing log. Any remaining additive, multiplicative or other non-linear effects can be solved for by including them as parameters in the inversion process.

The motion of reservoir fluid interfaces can be derived at block 122 and used as the basis for modifying the production profile at block 124. Production from a well is a dynamic process and each production zone's characteristics may change over time. For example, in the case of water flood injection from a second well, the flood front may reach some of the perforations and replace the existing oil production. Since the flow of water in formations is not very predictable, stopping the flow before such a breakthrough event often requires frequent monitoring of the formations. In response to the monitoring, the oilfield operator may adjust the rate of production, the rate of injection, and/or the injection and production geometry.

Figure 6:
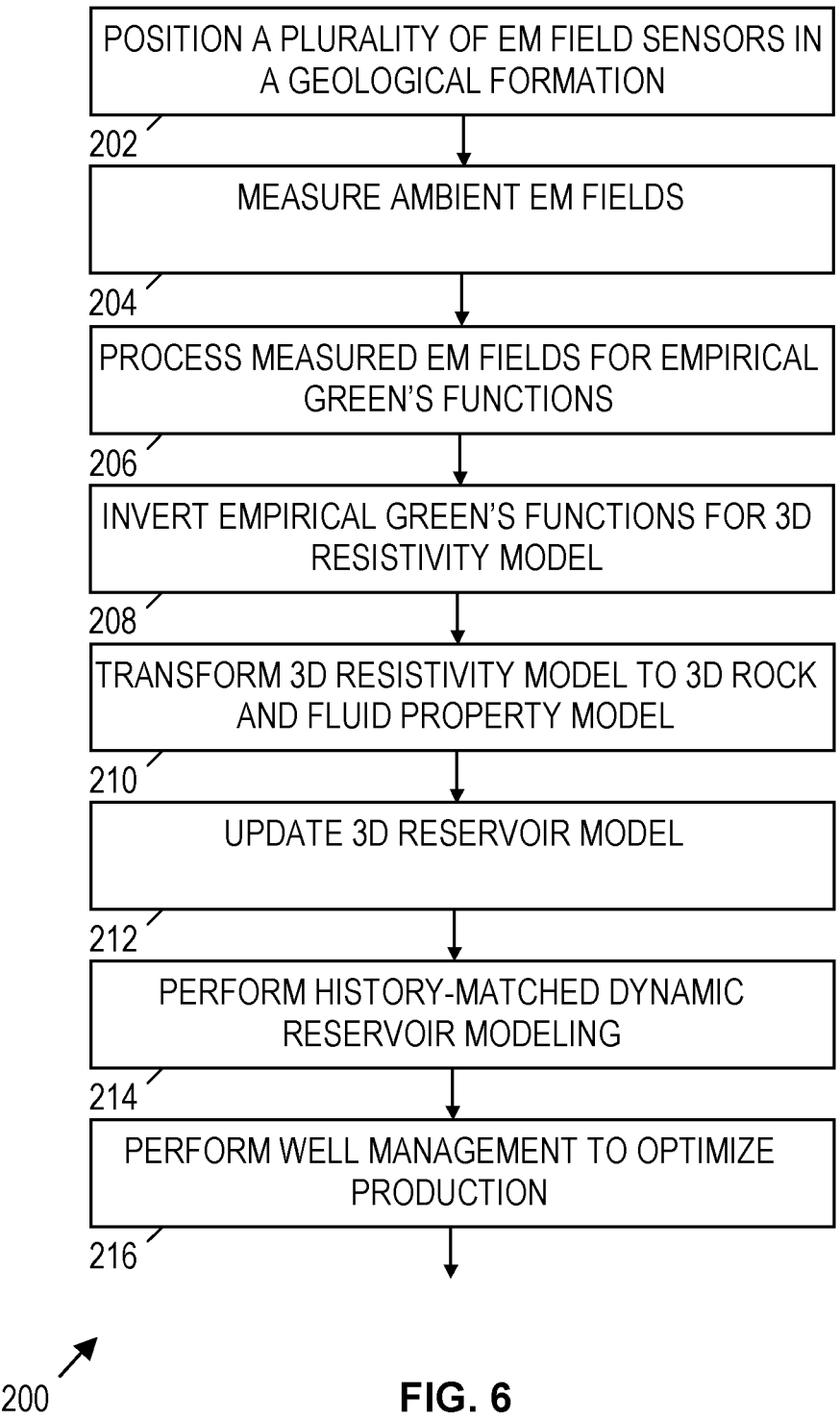
FIG. 6 shows an illustrative ambient EM interferometry method.

FIG. 6 shows a flowchart of an illustrative ambient EM interferometry method 200. The method 200 may be performed in part by a processor or computer in communication with a drill string, wireline tool string, or monitoring well equipped with EM field sensors as described herein. At block 202, a plurality of EM field sensors are positioned in a geological formation, e.g., as part of a drill string, a wireline sensor array, a permanent monitoring well, or any combination thereof in any number of boreholes. At block 204, ambient EM fields are measured at each of the sensor positions and, where available, in each component of the multi-component sensors. At block 206, measured EM fields are processed for empirical Green's Functions that represent sensor responses to an impulse from a virtual EM field source at a given position and orientation in the sensor array. An explanation of the response derivation process of block 206 will now be given.

Assuming exp(+iωt) time dependence, Maxwell's equations in the frequency domain for arbitrary ambient electric and magnetic sources are:

$$\nabla \times E = i\omega\mu H - i\omega\mu M, \quad (1)$$

$$\nabla \times H = \sigma E + J, \quad (2)$$

where J is the current from the ambient electric source, M is the magnetic dipole moment per unit volume of the ambient magnetic source, and all fields and material properties have an implicit dependence on the radial vector r unless stated otherwise. The conductivity is here assumed to be complex to be inclusive of permittivity and other frequency-dependent relaxation effects such as induced polarization. Allowing the conductivity to be complex permits modeling of both diffusive and wavelike propagation regimes by virtue of its real and imaginary components, respectively. In the following analysis, the quasi-static approximation $\sigma \gg \omega \epsilon$ is introduced for simplification, but it is accurate for the low frequencies and conductivities typically encountered in geophysical applications. However, the method can be readily generalized for high frequency regimes. Since most earth materials are non-magnetic, the magnetic permeability can be assumed equal to that of free space, but this assumption is not essential and the method can be generalized for magnetic materials. Furthermore, for explanatory purposes the following analysis only considers magnetic fields, but electric fields can be included without any loss of generality.

For the purpose of this disclosure, the following discussion will only consider magnetic fields, but the method can be generalized to include electric fields without any loss of generality. Taking the curl of equation (2) and substituting equation (1) results in the inhomogeneous Helmholtz equation for the magnetic field in forward-time:

$$\frac{1}{\sigma}\nabla \times \nabla \times H + i\omega\mu H = -\frac{i\omega\mu}{\sigma}M + \frac{1}{\sigma}\nabla \times J = F, \quad (3)$$

where F is a generalized source term of both magnetic and electric sources. In reverse-time, equation (3) has an analog form:

$$\frac{1}{\sigma}\nabla \times \nabla \times H^* - i\omega\mu H^* = +\frac{i\omega\mu}{\sigma}M^* + \frac{1}{\sigma}\nabla \times J^* = F^*, \quad (4)$$

Following P. M. Morse and H. Fesback, Methods of theoretical physics, part II: McGraw-Hill Company, New York (1953); R. F. Harrington, Time-harmonic electromagnetic fields: McGraw-Hill Company, New York (1961); and A. P. Raiche, An integral equation approach to three-dimensional modeling: Geophysical Journal of the Royal Astronomical Society, vol. 36, 363-376 (1974), equation (3) has the integral equation solution:

$$H(r') = \int_V \hat{G}(r',r) \cdot F(r) d^3r = G(r',r) \cdot F(r), \quad (5)$$

where G(r', r) is the volume integrated Green's operator of the Green's tensor, $\hat{G}$(r', r), where the elements $G_{ij}$ of the Green's tensor are the i-oriented magnetic fields at r' due to a j-oriented source at r.

From forward-time equation (3) and reverse-time equation (4) for finite sources, the representation theorem of convolution type is derived as:

$$\int_V (H_B \cdot F_A - H_A \cdot F_B) d^3r = 0, \quad (6)$$

and the representation theorem of correlation type is derived as:

$$2i\omega\mu \int_V H_B^* \cdot H_A d^3r = \int_V (H_B^* \cdot F_A - H_A \cdot F_B^*) d^3r. \quad (7)$$

Following equation (5), arbitrary sources $F_A(r_A)$ and $F_B(r_B)$ produce the magnetic fields:

$$H_A(r) = G(r, r_A) \cdot F_A(r_A), \quad (8)$$

$$H_B(r) = G(r, r_B) \cdot F_B(r_B), \quad (9)$$

which can be evaluated for positions $r_B$ and $r_A$, respectively:

$$H_A(r_B) = G(r_B, r_A) \cdot F_A(r_A), \quad (10)$$

$$H_B(r_A) = G(r_A, r_B) \cdot F_B(r_B). \quad (11)$$

If:

$$F_A(r) = \delta(r - r_A), \quad (12)$$

$$F_B^*(r) = \delta(r - r_B), \quad (13)$$

then from the convolution-type representation theorem, the reciprocity relation is derived as:

$$G(r_A, r_B) = G(r_B, r_A). \quad (14)$$

From the correlation-type representation theorem, a relation for the Green's tensor can be derived as:

$$2i\omega\mu \int_V G^*(r_B, r) \cdot G(r_A, r) d^3r = [G^*(r_A, r_B) - G(r_A, r_B)]. \quad (15)$$

From equation (15), and without loss of generality, consider the zz component of the Green's tensor, which corresponds to the z-oriented magnetic fields due to a z-oriented unit magnetic source. Noting that the Green's tensor is symmetric, then:

$$[G_{zz}^*(r_A,r_B)-G_{zz}(r_A,r_B)] = 2i\omega\mu \int_V [G_{zx}^*(r_B,r)G_{zx}(r_A,r) + G_{zy}^*(r_B,r)G_{zy}(r_A,r)+G_{zz}^*(r_B,r)G_{zz}(r_A,r)]d^3r. \quad (16)$$

Considering spatially uncorrelated sources with a power spectrum $|f(\omega)|^2$ that does not depend on location results in:

$$\langle F^*(r_1) \cdot F(r_2) \rangle = \delta(r_1 - r_2)|f(\omega)|^2, \quad (17)$$

where $\langle \ldots \rangle$ denotes the expectation value. Further, multiplying equation (16) by $|f(\omega)|^2$ results in:

$$|f(\omega)|^2[G_{zz}^*(r_A,r_B)-G_{zz}(r_A,r_B)] = 2i\omega\mu|f(\omega)|^2 \int_V [G_{zx}^* (r_B,r)G_{zx}(r_A,r)+G_{zy}^*(r_B,r)G_{zy}(r_A,r)+G_{zz}^*(r_B,r)G_{zz}(r_A,r)]d^3r \quad (18)$$

Evaluating the volume integral on the right-hand side results in:

$$|f(\omega)|^2[G_{zz}^*(r_A,r_B)-G_{zz}(r_A,r_B)] = 2i\omega\mu \langle H_z^*(r_B) H_z(r_A) \rangle. \quad (19)$$

Equation (19) demonstrates that the difference between the Green's function and its complex conjugate for a fictional z-oriented source at $r_B$ and a z-oriented receiver at $r_A$, scaled by the power spectrum of the uncorrelated and volume-distributed random noise sources, is simply given by the cross-correlation of the z-component magnetic fields due to the random noise sources measured at $r_B$ and $r_A$. In equation (19), $2i\omega\mu \langle H_z^*(r_B)H_z(r_A) \rangle$ corresponds to a cross-correlation of ambient EM field measurements at two of a plurality of EM field sensors, and $|f(\omega)|^2[G_{zz}^*(r_A,r_B)-G_{zz}(r_A,r_B)]$ corresponds to a derived response by an EM sensor at position $r_A$ in response to a virtual EM field source at sensor position $r_B$. Since multiplication in the frequency domain corresponds to convolution in the time domain, and the pre-factor $2i\omega$ corresponds to $-2d/dt$, then equation (19) in the time domain is expressed as:

$$[G_{zz}(r_A, r_B; -t) - G_{zz}(r_A, r_B; t)] * C_f(t) = \quad (20)$$
$$-2\mu \frac{d}{dt} \langle H_z(r_B; t) \otimes H_z(r_A; t) \rangle,$$

where * denotes convolution, ⊗ denotes correlation, and $C_F(t)$ is the autocorrelation of the noise, F(t). In equation (20), $$-2\mu \frac{d}{dt} \langle H_z(r_B; t) \otimes H_z(r_A; t) \rangle$$

corresponds to a time derivative of the cross-correlation of ambient EM field measurements by EM field sensors at positions $r_A$ and $r_B$, and $[G_{zz}(r_A,r_B;-t)-G_{zz}(r_A,r_B;t)]*C_f(t)$ is the derived response for the sensor at position $r_A$ to a virtual EM field source at sensor position $r_B$. Note that equations (19) and (20) do not require any a priori knowledge of the geological formation's conductivity or heterogeneity, or the origins or characteristics of the random noise sources. If, however, the noise autocorrelation is measured, the derived responses can be de-convolved by $C_F(t)$ to obtain bracketed term representing the empirical Green's Function between sensor positions $r_A$ and $r_B$.

In method 200 various models may be updated using the derived responses. For example, in block 208 the system may employ a parameterized 3D resistivity model to invert the derived responses or the empirical Green's Functions determined at block 206. In block 210, the system can employ the derived responses separately or together with the resistivity model to transform the resistivity model into a 3D rock and fluid property model, from which a 3D reservoir model can be derived and updated at block 212. The system may then refine the reservoir model by performing perform history-matched dynamic reservoir modeling at block 214. Based on the reservoir model and historical effects of previous changes to injection and production parameters, the system may provide well management or recommendations to optimize production at block 216.

The premise of the disclosed EM interferometry systems and methods is that the ambient EM fields of correlated, random noise sources can be measured by at least two EM sensors deployed in a downhole environment. The limiting factors are the sensitivity of the EM sensors, and the amplitude of the ambient EM fields. Known magnetic field sensors have a nominal sensitivity of 1 µA/m, implying that the ambient magnetic fields should have an amplitude greater than 1 µA/m for the disclosed techniques to be applicable.

The ambient EM fields can be generated by any number of random sources within the geological formation, such as telluric currents, electrokinetics, thermoelectrics, electroosmosis, piezioelectricity, and electrolyte diffusion, that are distributed about the EM sensors. Of these noise sources, telluric currents are stochastic in their amplitude, phase, and polarization, and always exist due to the permanent turbulence of space and atmospheric weather.

Without limitation, the EM field sensors for detecting these ambient EM fields may be electric and/or magnetic dipole sensors that are deployed on optical fibers. Such EM field sensors may use a small number of electrical and/or magnetic parts and involve minor modifications on the optical fiber that make the fiber sensitive to EM fields. For example, a plurality of EM field sensors can be placed in an array type of arrangement at axially separated positions along the well. The signals from different EM sensors can be multiplexed downhole, and demultiplexed and individually received at the surface. The measurement orientation can be in any arbitrary direction and three independent measurements at each spatial location can be made. Further, multiple arrays of such sensors can be placed in multiple wells for cross well tomography applications.

Numerous other variations and modifications will become apparent to those skilled in the art once the above disclosure is fully appreciated. It is intended that the following claims be interpreted to embrace all such variations and modifications where applicable.

What is claimed is:

1. An electromagnetic interferometry system, comprising:
   a first electromagnetic field sensor at a first position in a downhole environment; and
   a second electromagnetic field sensor at a second position in the downhole environment;
   a processing unit that receives a first electromagnetic field measurement from the first electromagnetic field sensor and a second electromagnetic field measurement from the second electromagnetic field sensor,
   wherein the processing unit derives a response of the first electromagnetic field sensor to a virtual electromagnetic field source at the second position by cross-correlating the first electromagnetic field measurement with the second electromagnetic field measurement, and
   wherein the processing unit performs an inversion process based at least in part on the derived response to obtain a model of subsurface formation properties.

2. The system of claim 1, wherein the first and second electromagnetic field measurements correspond to ambient electromagnetic field measurements.

3. The system of claim 1, further comprising a third electromagnetic field sensor at a third position in the downhole environment,
   wherein the processing unit receives a third electromagnetic field measurement from the third electromagnetic field sensor and derives a response of the second electromagnetic field sensor to a virtual electromagnetic field source at the third position by cross-correlating the second electromagnetic field measurement with the third electromagnetic field measurement, and
   wherein the processing unit derives a response of the third electromagnetic field sensor to a virtual electromagnetic field source at the second position by cross-correlating the second electromagnetic field measurement with the third electromagnetic field measurement.

4. The system of claim 1, further comprising a display that renders a visual representation of said model.

5. The system of claim 1, wherein the processing unit repeatedly receives electromagnetic field measurements, derives responses to virtual electromagnetic field sources, and obtains models of subsurface formation properties based at least in part on the derived responses, and wherein the processing unit compares said models and outputs a control signal to adjust at least one production or injection rate setting in response to the comparison.

6. The system of claim 1, wherein the or each derived response is representable in the frequency domain as:

$$|f(\omega)|^2 [G_{zz}^*(r_A, r_B) - G_{zz}(r_A, r_B)] = 2i\omega\mu \langle H_z^*(r_B) H_z(r_A) \rangle,$$

where $|f(\omega)|^2$ is a power spectrum of ambient electromagnetic fields; $G_{zz}(r_A, r_B)$ is Green's Function between electromagnetic field sensors at the first position, $r_A$, and the second position, $r_B$; $G_{zz}^*(r_A, r_B)$ is a complex conjugate of $G_{zz}(r_A, r_B)$; i is $\sqrt{-1}$; $\omega$ is an angular frequency; $\mu$ is a permeability value; and $\langle H_z^*(r_B)H_z(r_A)\rangle$ is a cross-correlation of z-component electromagnetic field measurements obtained at $r_A, r_B$.

7. The system of claim 1, wherein the or each derived response is representable in the time domain as:

$$[G_{zz}(r_A, r_B; -t) - G_{zz}(r_A, r_B; t)] * C_f(t) = -2\mu \frac{d}{dt} \langle H_z(r_B; t) \otimes H_z(r_A; t) \rangle,$$

where $G_{zz}(r_A, r_B; -t)$ is a time-reversed time-domain Green's Function between electromagnetic field sensors at the first position, $r_A$, and the second position, $r_B$; $G_{zz}(r_A, r_B; t)$ is a time-domain Green's Function between electromagnetic field sensors at positions $r_A$ and $r_B$; * denotes convolution; $C_F(t)$ is an autocorrelation of noise F(t); $\mu$ is a permeability value; and $\langle H_z(r_B; t) \otimes H_z(r_A; t) \rangle$ is a time-domain cross-correlation of z-component magnetic fields at $r_A$, and $r_B$.

8. The system of claim 1, further comprising a drill string, wherein the electromagnetic sensors are attached to the drill string.

9. The system of claim 1, further comprising a wireline tool string, wherein the electromagnetic sensors are attached to the wireline tool string.

10. The system of claim 1, wherein the electromagnetic sensors are positioned in a monitoring well.

11. The system of claim 1, wherein the modeled subsurface formation properties include resistivity, permittivity, or a fluid property.

12. An electromagnetic interferometry method, comprising:
receiving a first electromagnetic field measurement from a first electromagnetic field sensor at a first position in a downhole environment;
receiving a second electromagnetic field measurement from a second electromagnetic field sensor at a second position in the downhole environment;
deriving a response of the first electromagnetic field sensor to a virtual electromagnetic field source at the second position by cross-correlating the first electromagnetic field measurement with the second electromagnetic field measurement; and
performing an inversion process based at least in part on the derived response to obtain a model of subsurface formation properties.

13. The method of claim 12, wherein the derived response is based on a frequency-domain calculation with Green's Functions between the first and second positions.

14. The method of claim 12, wherein the derived response is based on a time-domain calculation with Green's Functions between the first and second positions.

15. The method of claim 12, further comprising displaying the model.

16. The method of claim 12, further comprising positioning the first and second electromagnetic field sensors in the borehole using a drill string or wireline tool string.

17. The method of claim 12, further comprising positioning the first and second electromagnetic field sensors in a monitoring well without an electromagnetic field source.

18. The method of claim 12, further comprising positioning the first and second electromagnetic field sensors in different monitoring wells to perform crosswell electromagnetic tomography.

19. The method of claim 12, further comprising attaching the first and second electromagnetic field sensors to a drill string without an electromagnetic source to perform logging-while-drilling operations using ambient electromagnetic field measurements received by the first and second electromagnetic field sensors while the drill string is in the borehole.

20. The method of claim 12, further comprising attaching the first and second electromagnetic field sensors to a drill string or wireline tool string with an electromagnetic source to perform logging operations using ambient electromagnetic field measurements received by the first and second electromagnetic field sensors in response to electromagnetic source failure.

* * * * *

UNITED STATES PATENT AND TRADEMARK OFFICE
CERTIFICATE OF CORRECTION

| | | |
|---|---|---|
| PATENT NO. | : 9,562,988 B2 | Page 1 of 1 |
| APPLICATION NO. | : 14/909914 | |
| DATED | : February 7, 2017 | |
| INVENTOR(S) | : Glenn A. Wilson and Burkay Donderici | |

It is certified that error appears in the above-identified patent and that said Letters Patent is hereby corrected as shown below:

In the Specification

Column 6, Formula (1), the right-hand of the formula "$i\omega\mu H - i\omega\mu M$" should read as -- $-i\omega\mu H - i\omega\mu M$ --

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*